Patented Jan. 5, 1932

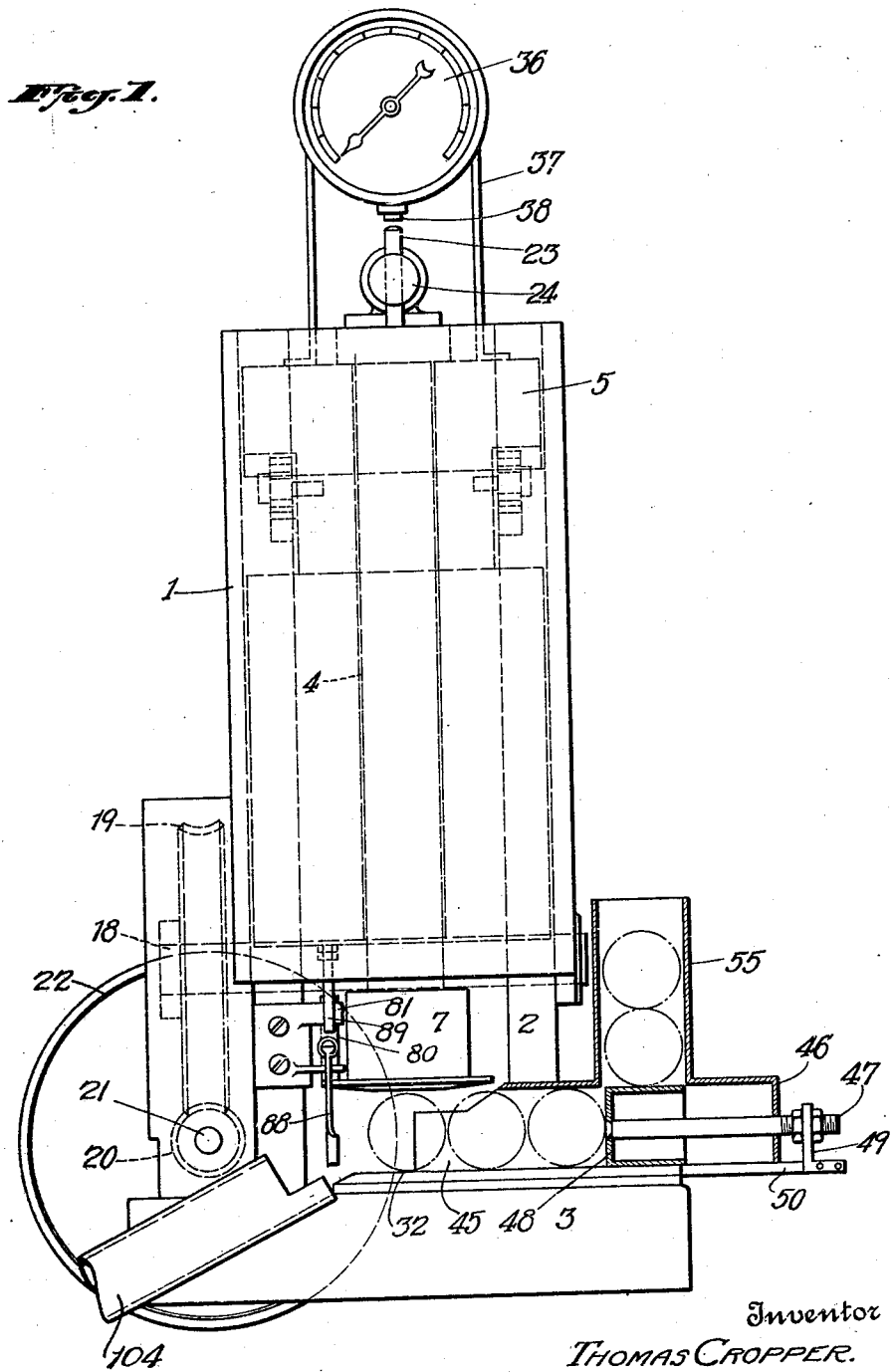

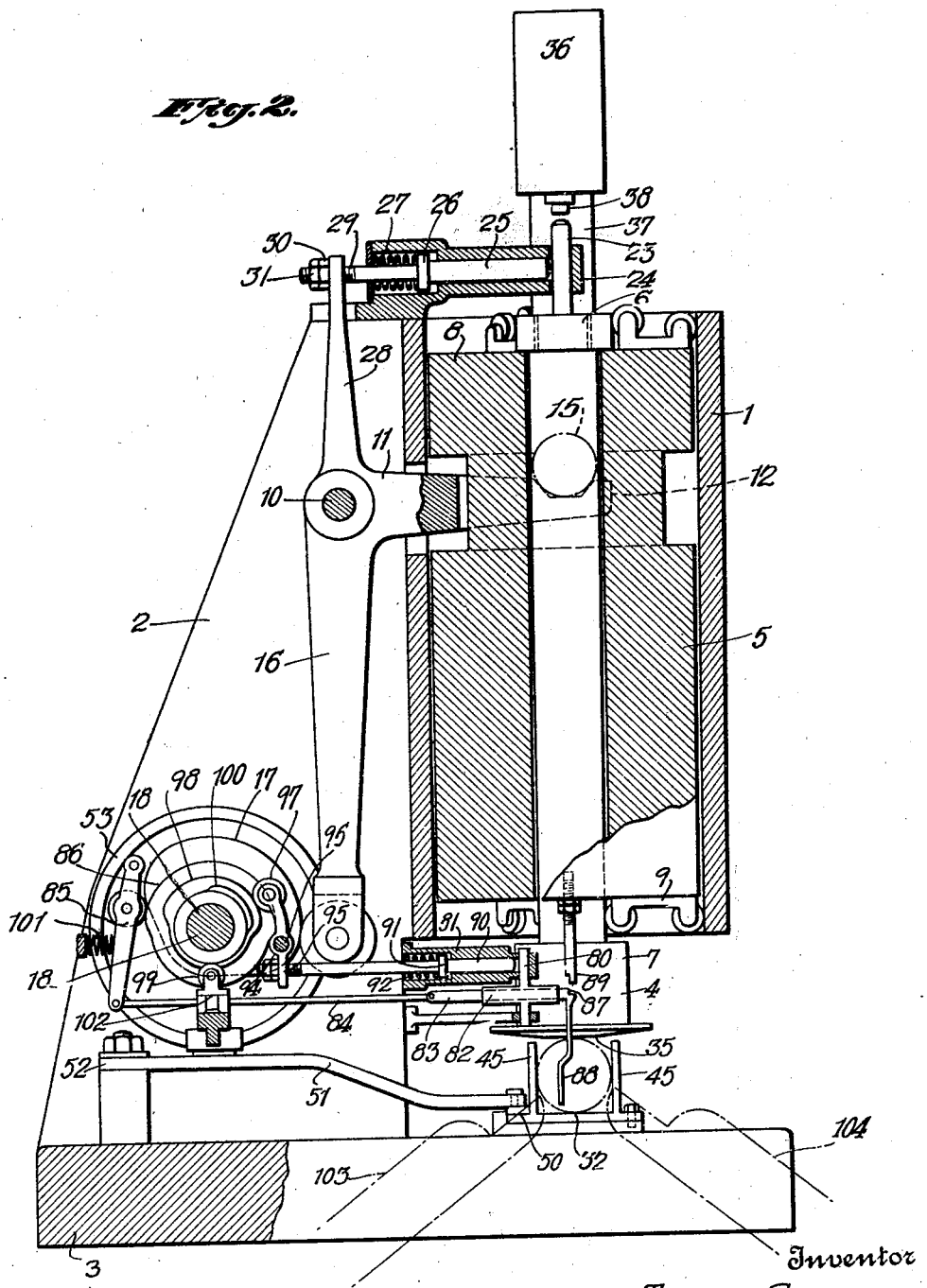

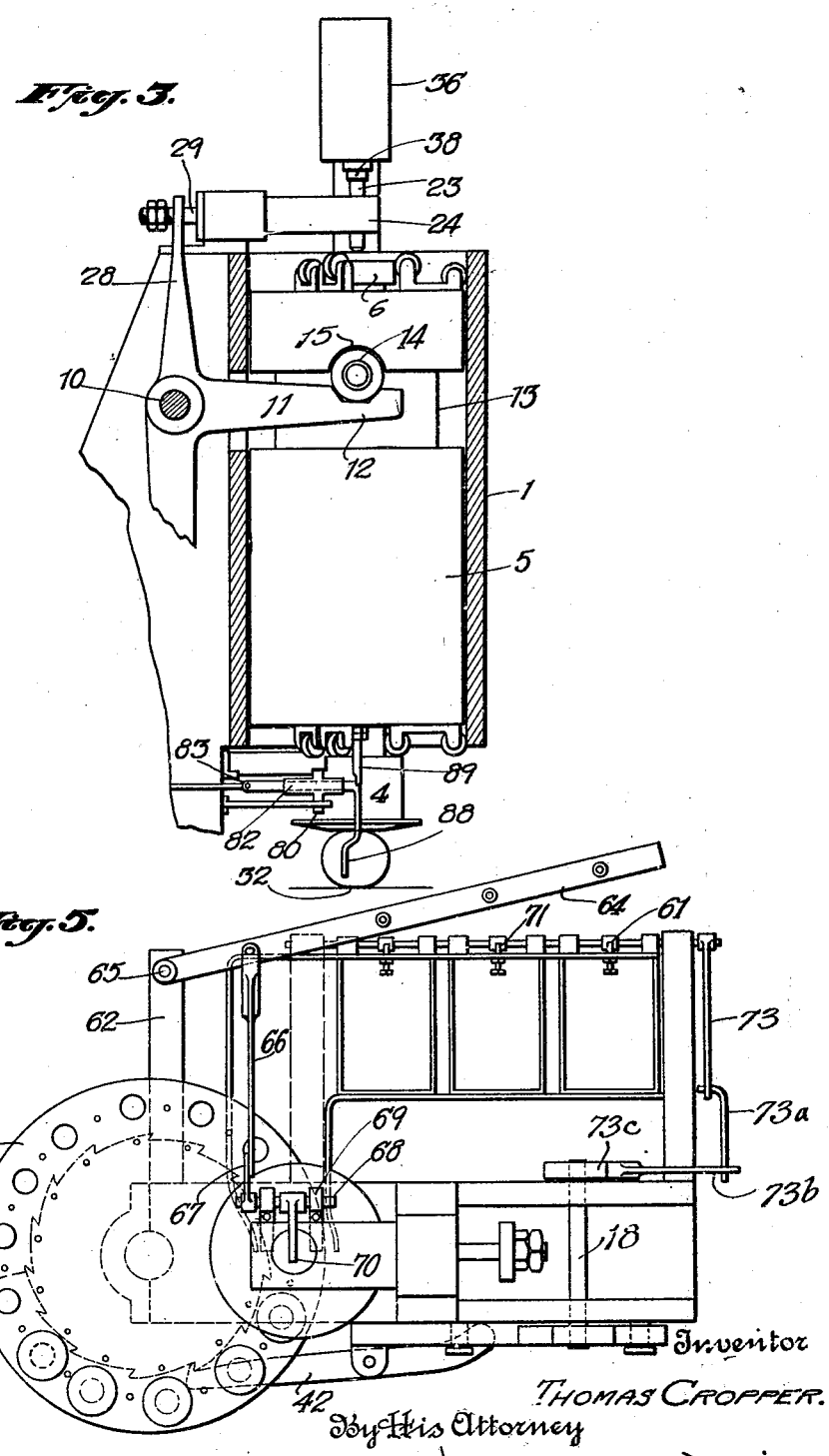

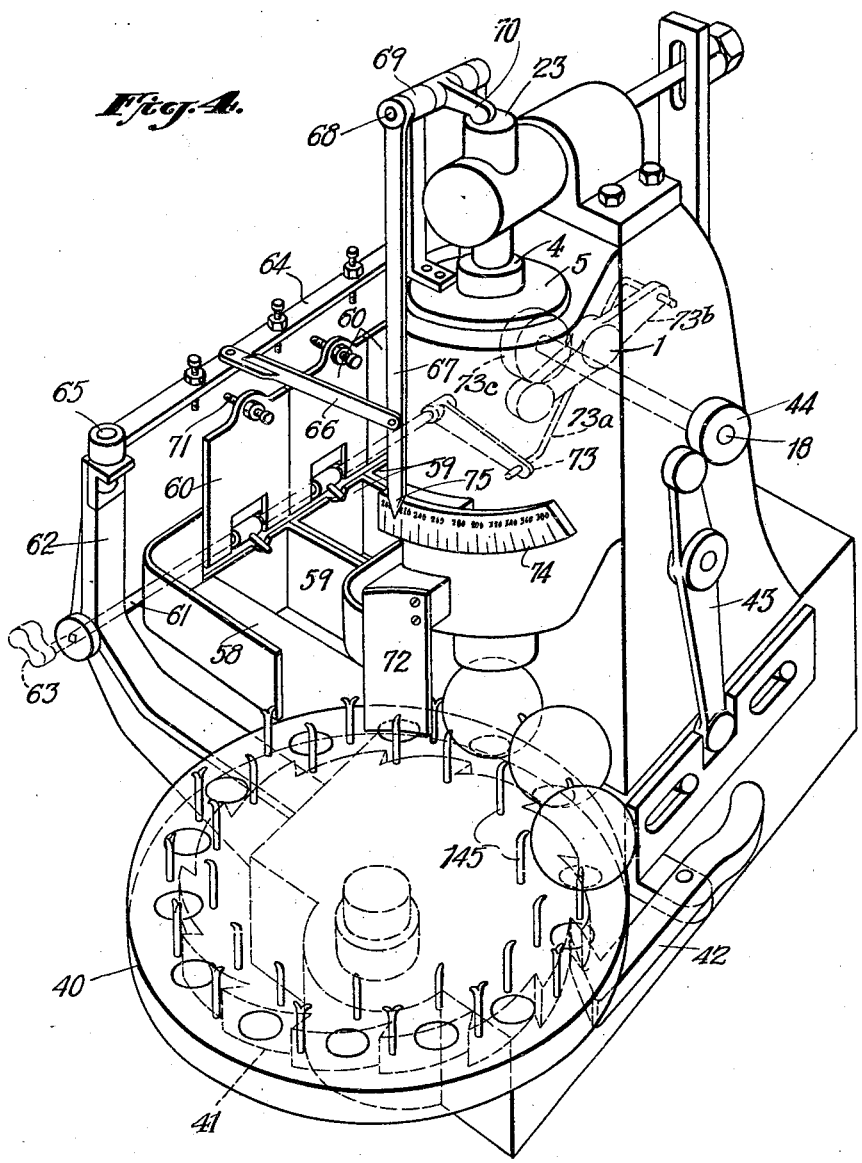

1,839,376

UNITED STATES PATENT OFFICE

THOMAS CROPPER, OF ERDINGTON, ENGLAND, ASSIGNOR TO DUNLOP RUBBER COMPANY LIMITED, OF LONDON, ENGLAND, A BRITISH COMPANY

APPARATUS FOR ASCERTAINING THE COMPRESSIBILITY OF ARTICLES OR MASSES AND GRADING THE OBJECTS SO TESTED

Application filed January 11, 1929, Serial No. 331,803, and in Great Britain April 4, 1928.

This invention relates to a new or improved apparatus for testing the compressibility of articles or masses in order that the degree of resiliency therein may be ascertained, and is particularly applicable for grading or testing the compressibility of objects wherein rubber is included, either as part of or the whole as for instance tennis balls, golf balls, the cores for golf balls or rubber balls generally. It is within the scope of this invention, however to utilize the apparatus for testing other matter, either in its worked or unworked condition.

The apparatus with which this invention is concerned is of that type devised for performing the tests known to the trade or as required by the rules of the "International Lawn Tennis Federation" and which consists in principle in first subjecting the objects to a determined imposition or load, after which a further determined imposition is imposed, whereupon the deformability or compression that has occurred in respect of the second imposition beyond that of the first imposition is defined, the data resulting therefrom forming the basis of classifying the grades of the objects.

According to this invention the pressure imposing device is composed of a unitary element comprising two component weight imposing elements, one of which has to perform both an initial function and a subsequent function, the subsequent function being in combination with the other element, the elements being arranged to permit movement between them, means being provided to determine the extent of both the initial and the subsequent functions, the means being controlled by a device that responds to and has a movement relative only to the movement of the element having the initial function to perform, the device ceasing in its movement before the time when both elements function in unison.

The apparatus according to this invention further comprises means both for directing the objects to or away from the testing devices, and if desired into receptacles corresponding with the grades of the objects defined as the result of the test.

In order that this invention may be clearly understood I have appended hereto four sheets of drawings wherein:—

Figure 1 is a front elevation of one embodiment of an apparatus constructed according to this invention, shown with the weights elevated ready to perform a test.

Figure 2 is a side view in part section of the apparatus of Fig. 1.

Figure 3 is a fragmental side view in part section at a reduced scale showing the weights in the position assumed at the termination of the test.

Figure 4 is a perspective view of a further embodiment illustrating a rotary feed table.

Figure 5 is a plan view of Fig. 4.

Referring first to Figs. 1 to 3, the apparatus comprises a suitably formed housing 1 depending from a web or webs 2 upstanding from a base plate 3. The housing 1 is recessed axially and receives within it the unitary weight, which as previously described is composed of two elements 4—5 the former being of lesser weight than the latter. For the purpose of the test, the element 4 is required also to perform an initial function, and to permit of relative movement between it and the element 5 it is of greater dimension longitudinally than the element 5. To prevent the element 4 from passing completely through the element 5 collars or enlargements 6—7 are furnished at both of its ends. These collars or abutments further serve to unite the elements during their combined functions, the top collar 6 being adapted to contact with the upper surface 8 of the element 5 so that the two elements may be raised at some time as a body, while the lower collar is adapted to coact with the roller bearing 9 of the element 5 at such time when the two elements combine to perform a common function.

It is necessary both to raise and to lower the elements and in one of the means adopted for this purpose I have provided pivotally secured upon a spindle 10 housed within bearings upon the web members 2 a bell-crank or other lever the limb 11 of which is forked at its end to produce a recess 12 which lies within a recess 13 in the element 4 and through the roller bearing 14 acts upon the upper face 15 of the recess 13 while the other limb 16 carries a roller as shown which bears against a suitably contoured cam 17 that is mounted upon a shaft 18 housed in bearings in the webs 2, the shaft being rotated by a worm wheel 19 engaging a worm 20 mounted upon the shaft 21 which takes its drive from the pulley 22.

In accordance with that feature of this invention where it is desired to define the movement of the element 4 and afterwards to indicate the movement of the two elements as a unit, and for this purpose I have provided a device 23 which might more conveniently be termed a datum plunger, shown at 23, adapted to move within a bearing 24 secured rigidly to the webs 2.

The datum plunger 23 may be adapted to coact with any of the upper surfaces of the collars of element 4 and is allowed to move only during the period of the initial movement of the element, the datum plunger 23 being restrained at the desired period against movement by a detent or lock which, in the form illustrated, comprises a plunger 25 mounted in the bearing 24 and upon which a collar 26 engaging a spring 27 is provided. To render the detent 25 operable or not it is adapted to be reciprocated longitudinally by a lever which might as shown comprise an additional limb 28 to the bell-crank lever. The plunger 25 is provided with a screw threaded extension 29 upon which locking nuts 30—31 are received.

The performance of the datum plunger 23 is such that the lock or detent 25 is withheld from contacting the datum plunger 23 during the initial movement of the element 4, but during the period of the downward movement of the element 5 and the momentary inactivity of the element 4 but previous to the face 9 of the element 5 contacting the collar 7 the detent 25 moves or is moved toward the datum plunger 23 to clamp it. The datum plunger is held thus against movement for the further downward movement of the elements as a unit, and preferably thereafter practically throughout the elevating of the element after the test has been performed. The performance of the weighting elements is as follows: The object to be tested is placed upon or presented to rest on the base plate 32, it being assumed that prior to this the cam shaft 18 has been set in motion and that the elements 4—5 have been elevated as a unit to the highest desired point by the lever 12; the lock or detent 25 being held against restraining the datum plunger.

The elements 4—5 now move downwardly under the influence of gravity as a unit the face 35 of the element 4 contacts the object under test. The elements 4—5 will move further downwards in unison, only to an extent subject to the resistance the object presents to the element 4.

The element 5 now moves downwardly alone and will finally rest upon the collar of the element 4. Before the face 9 contacts the collar of the element 4, the datum plunger which has performed a movement identical in extent to that of the element 4 is locked against further movement by the imposition of the detent 25.

Owing to the increased weight now occasioned by the imposition of the element 5 upon the element 4, the object under test yields to a further degree the extent of which defines the basis of the test.

To indicate or register the extent of the compressibility of the object under the weight of the combined elements a gauge 36 attached by brackets 37 to the elements 5 having a contact member 38 provided to coact with the top end of the datum plunger and arranged so that the recording means only commences to operate from the time when the element 5 impinges upon the element 4, and to occasion this the contact member 38 is spaced away from the datum plunger for a distance equal to the difference between the total length of the element 5 and the distance between collars 6—7.

Alternatively the registering device as shown in Fig. 4 and referred to hereinafter may be replaced by a lever suitably fulcrumed that is caused to pivot according to the degree of the deformability of the object, the lever if desired being combined with or adapted to coact with other means for directing or ejecting the object away from the testing devices upon completion of the test.

Another feature of this invention is the provision of means if desired, for automatically delivering and removing the objects away from the testing devices, and in one form (see Figs. 4–5) may comprise a rotary platform 40 mounted upon the base plate and adapted to be rotated by a ratchet 41 and a pawl 42 with a step by step motion, the pawl being reciprocated by any suitable means, as for instance a pivoted lever 43 coacting with a cam 44 upon the shaft 18, the rotary platform being provided with object retaining or spacing devices 145 which are presented successively underneath the testing devices.

Alternatively if desired, or in combination with the rotary platform there may be provided a reciprocating automatically actuating plunger adapted to separate a single object from a bulk and deliver it to the testing devices, the plunger being actuated by lever or rod contacting at its one end with a cam or other means and as shown in Figs. 1–2 we may provide a chute composed of a pair of slats 45 disposed parallel with one another and closed at the one end by a member 46 through which is passed the stem 47 of a plunger 48.

Secured to the stem 47 is a bracket 49 upstanding from a rod 50 to which one end of a lever 51 is pivotally secured, the rod being restrained in guides to allow of it being moved longitudinally. The lever 51 is fulcrumed at 52 and is engaged by a side-face cam 53 which operates to swing the lever and to force the plunger along the chute moving a ball with it and depositing it upon the rest 32. A newly admitted ball would remove a previously tested ball away from the rest.

Communicating with the chute is a supply chute 55 wherein a number of balls are located and which as shown in Figs. 1–2 is disposed vertically, the chute may be arranged otherwise if desired, for instance to admit the balls to the chute sidewardly.

Another feature of this invention is the provision either in combination or otherwise with any of the previously described means of a further means for automatically separating and delivering the tested objects into receptacles corresponding with the grades of the objects. A convenient construction of such means is illustrated in Figs. 4–5 and comprises a chute 58 having a number of apertures 59 adapted to be closed by devices in the form of trap-doors 60 which are hingedly mounted upon a common spindle 61 mounted upon brackets 62 and normally remain open either by a counterbalance 63 or other means, and are controlled by a lever 64 pivoted at 65 and connected by a link 66 to a lever 67 that is secured to a shaft 68 housed within brackets 69 upstanding from and secured to the element 5. There is also provided upon the shaft 68 a lever 70 that is adapted to contact the datum plunger 23, is being appreciated that there would be as previously stated a period of lost motion between the lever 70 and the datum plunger.

The function of the selecting mechanism described with reference to Figs. 4–5 is such that the lever 70 would, as the result of the downward movement of the elements 4—5, rotate the shaft 68 and would swing the lever 67 sidewardly and through the link 66 would swing the lever 64. There are provided upon the members 60, pegs 71 which may engage the lever 64. As the result of the movement of the lever 64 the pegs 71 of the members 60 may contact therewith, thereby causing the members 60 to fall. As will be seen the extent to which the lever 64 is swung governs the sequence in which the members 60 fall. It is preferable for the members 60 nearest the chute 58 to fall first and thereafter the remainder to fall consecutively. Moreover any number of the apertures 59 with their attendant members 60 may be provided, the amount of such only being influenced by the number of grades it is desired to define.

In the test and assuming that the object was hard for its class, then it would not distort to any considerable degree under the imposition of the weight of the combined elements 4—5, so that only a small degree of movement would occur in the lever 70 the intermediate linkage and the lever 64 and none of the pegs would be contacted and none of the members 60 would fall. The object after the test therefore, upon being removed from the testing position—which in the case of a rotary feed table would be effected by a member 72 or other means,— would roll down the chute 58 and into the first of the apertures 59.

The apertures 59 it must be understood constitute receptacles for containing the objects, or form members to direct the objects to receptacles.

Should the object as the result of the test be found less hard, the apertures 59 up to the selected aperture would be closed by the members 60 and the objects would roll over them.

It is necessary however that after selection of each object and prior to completing another object all the members must be raised and in one of the means adopted for this purpose we provide an arm 73 to rotate the shaft 61. This arm is rocked by a link 73$^a$ connected to a lever 73$^b$ which in turn is actuated by a cam 73$^c$ carried by the shaft 18.

Visual indicating means may be provided in combination with the selecting means if desired, and as shown may comprise a dial 74 co-operating with an extension 75 of the lever 67.

Another form of constructing the selecting and delivering means is shown in Figs. 1–2 comprises a datum plunger 80 housed in brackets 81 upon the base plate or other part of the apparatus, the datum plunger 80 being provided with an axially recessed horizontal sleeve 82, in which is received a stem or shaft 83 which is connected by a rod 84 to a lever 85 which is acted upon by a cam 86. The stem or shaft 83 has one or more notches 87 provided at its end and has depending from it a member 88.

Extending from and secured to the element 5 is a contact member 89 which is adapted to engage the notch 87.

As in the case of the plunger 23 a detent 90 is proivded being formed as part of or with a stem 91 whereon a collar 92 which is influenced by a spring 93 is formed.

Upon the stem 91 are nuts 94 against which the limb 95 of a lever fulcrumed at 96 rests, the lever having a further limb to which is pivotally secured a roller 97 which rests against a cam 98 mounted upon the shaft 18.

There also is provided to act upon the rod 84 a detent member 102 influenced by a roller 99 which bears against the cam 100, the purpose of this detent being referred to hereunder in relating the function of the members associated with the plunger member 80 and which are as follows:—

Upon the object being imposed upon the rest 32 the elements 4—5 lower the element 4 carrying with it the member 80. Upon the temporary cessation of movement of the element 4 the cam 98 permits the plunger 90 to impinge upon the member 80 holding it against movement.

After the imposition of the element 5 it will be found that the contact member 89 has been carried downwardly, and when the full load of the combined element has been imposed and the distortion in the object having taken place the cam 86 has rotated to such a position to allow of the stem 83 travelling longitudinally under the influence of the spring 101. Should the object distort to a certain degree the contact arm 89 will have attained a position where it will engage the notch 87 and thus prevent the stem from moving. Thus is the member 88 held against movement. Moreover to ensure holding the member 88 the detent 102 acts upon the rod 84.

In the event of the tested object proving comparatively hard the downward movement of the member 89 is reduced and it does not engage the notch 87 resulting in the sliding of the stem 83 longitudinally through the sleeve 82.

The performance of the stem 83 controls the disposition of the member 88 which constitutes a guide for directing the objects after the test into the chutes 103—104.

Of course, it will be understood that a series of notches 87 may be provided in stepped or other formation, whereupon the guide 88 would have more than the two positions to assume.

The relation between the contact member 89 and the notches 87 on the stem 83 is of direct contact, but if desired the contact member 89 may act upon a catch or analogous member secured to the sleeve 82, such catch normally being held out of engagement with the notches 87 by a spring or other resilient means.

What I claim is:

1. An apparatus for testing the compressibility of articles, comprising a loading unit including two interengaging concentric parts arranged so one can move relatively within the other, means controlling the lifting and lowering of the outer part, a plunger secured to the inner part and which partakes of the common downward movement of said parts, cam controlled means for locking and releasing said plunger, and a compressibility indicator carried by said outer and coacting with said plunger.

2. An apparatus for testing the compressibility of articles, comprising a loading unit including two concentrically arranged parts arranged so one can move longitudinally within the other and successively impose a load on the article under test, automatic means controlling the lifting and lowering of one of said parts, a plurality of receivers adapted to receive different grades of articles tested, a deflecting stem and a member secured directly to one of said parts for direct coaction with said stem for deflecting each tested article to an appropriate receiver in accordance with the degree of compression effected by said loading unit.

3. An apparatus for testing the compressibility of articles, comprising a loading unit including two concentric interengaging parts arranged so one can move relatively to the other, a cam actuated lever controlling the lifting and lowering of one of said parts, a self contained compressibility indicator unit mounted on one of said parts and arranged to have a period of inactivity identical with the period of relative movement of said parts during the downward movement thereof, one of said parts being nested within the other and one of them having anti-friction bearings for guiding the other.

4. An apparatus for testing the compressibility of articles, comprising a loading unit including two interengaging parts arranged so one can move relatively to the other, means controlling the lifting and lowering of one of said parts, a member coacting with one of said parts, a stem mounted in said member for movement substantially at right angles to the line of movement of said loading unit, means actuated by the loading unit for limiting the travel of said stem, supporting means for moving the stem in one direction and power driven means for moving it in the opposite direction, and deflecting means carried by said stem for influencing the direction of travel of the tested articles.

In witness whereof, I have hereunto signed my name.

THOMAS CROPPER.